Patented Mar. 6, 1928.

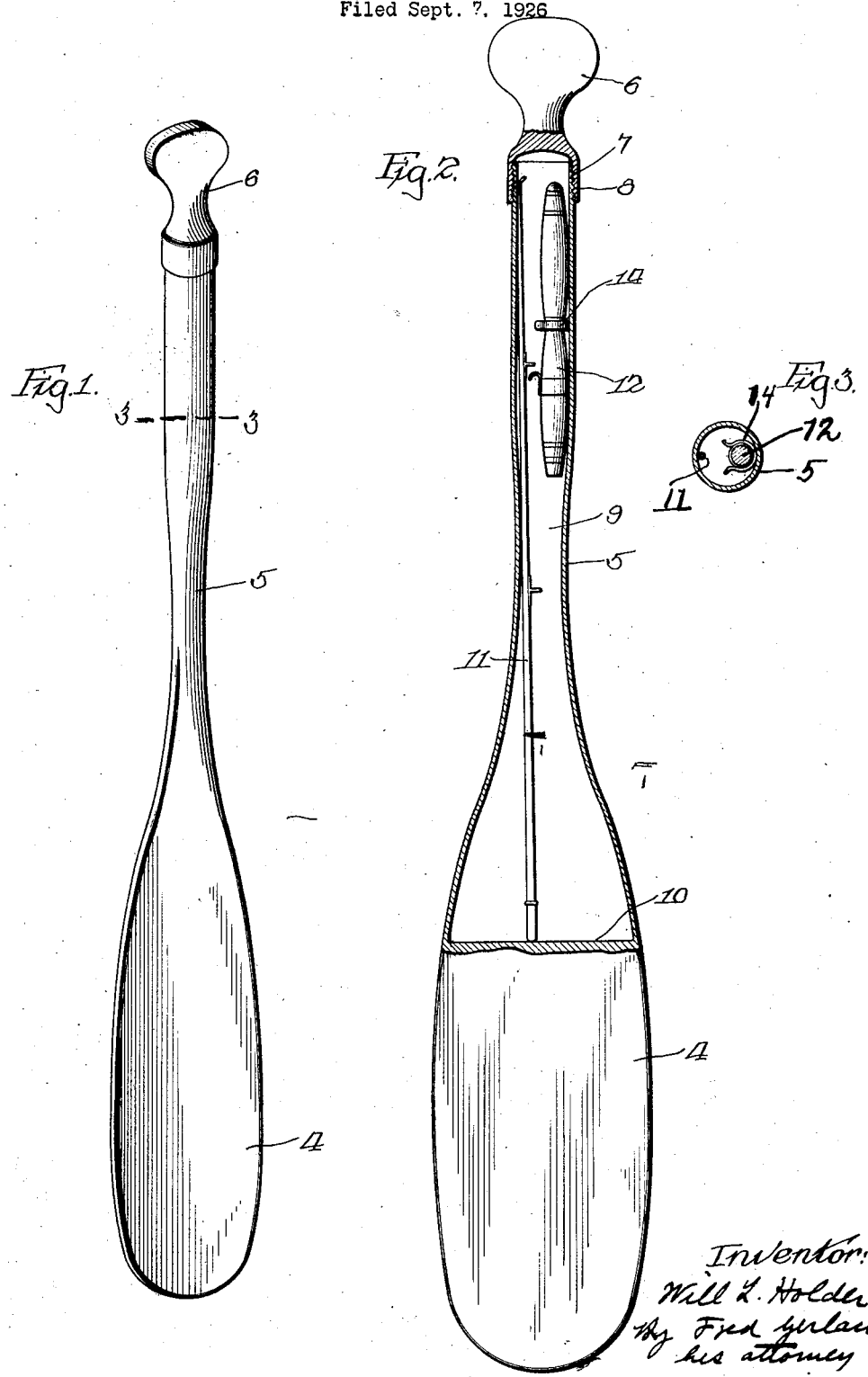

1,661,289

UNITED STATES PATENT OFFICE.

WILL L. HOLDER, OF VALDOSTA, GEORGIA.

PADDLE.

Application filed September 7, 1926. Serial No. 133,744.

The invention relates to paddles used in canoeing.

In canoeing, it is customary to carry a fishing rod so that the canoists may fish whenever fishing grounds are reached or whenever desired. In canoeing trips, it is desirable to reduce the pack which must be carried, to convenient and condensed form for transportation over portages, etc. The primary object of the invention is to provide a convenient way of protecting a fishing rod in its transportation and of packing it for transportation, and this object is attained by providing a combination paddle and rod-case. This makes it possible to conveniently carry a fishing rod over portages or over trails or whenever it is not in use.

The invention consists in the several novel features hereinafter set forth and more particularly defined by the claims at the conclusion hereof.

In the drawings: Fig. 1 is a perspective of a paddle embodying the invention. Fig. 2 is a longitudinal section. Fig. 3 is a section taken on line 3—3 of Fig. 1.

The invention is exemplified in a paddle comprising a blade 4, a hollow stem 5 and a handle 6 which is removably secured to the upper end of the hollow stem by means of an internal screw-thread 7 on the handle which engages a corresponding male thread 8 on the upper end of the hollow stem 5. The stem 5 is tubular and a chamber 9 therein extends from the handle downwardly into the blade to a point 10 so that the chamber will be of sufficient height to retain a fishing rod 11 when it is separated from its handle 12. If desired, a spring clip 14 may be provided in the chamber 9 to fixedly retain the handle in the upper portion thereof. The upper end of the handle 6 is preferably flattened approximately in the plane of the blade 4 so the paddle may be properly manipulated in paddling.

When the handle 6 is removed from the stem 5, the fishing rod 11 and its handle 12 may be removed from or placed into the chamber 9 in the paddle. When the handle 6, which serves as a cap for said chamber, is secured to the stem, the rod and handle 12 will be enclosed, so that the necessity of separately carrying the rod, when it is not in use, will be dispensed with. The paddle may be formed of cast aluminum or other suitable material and the tubular formation of the stem and upper portion of the blade make it possible to avoid excessive weight in the paddle.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A paddle for a canoe comprising a narrow tubular stem, a comparatively short member removably secured to one end of the stem and shaped to form a hand-grip, and a substantially flat blade fixedly connected to the other end of said stem, the hollow portion of the stem forming a chamber of sufficient proportions to receive a fishing rod or similar article, the chamber being open at the said one end of the stem to permit insertion and removal of the article, the grip-member serving to close the open end of the chamber to retain the article in said chamber.

2. A paddle for a canoe comprising a narrow tubular stem, a comparatively short member removably secured to one end of the stem, and having its outer portion shaped to form a hand-grip, a substantially flat blade fixedly connected to the other end of the stem, said blade having at its inner end a hollow portion connecting with the hollow portion of the stem and forming therewith a chamber of sufficient height to receive a fishing rod in knockdown form, the chamber being open at the said one end of the stem to permit insertion and removal of the rod, the grip-member serving to close the open end of the chamber to retain said rod in the chamber, and a clip secured to the inner wall of the stem for holding the handle of the rod against movement while in the chamber.

Signed at Valdosta, Georgia, this 26th day of July, 1926.

WILL L. HOLDER.